US012047747B2

(12) United States Patent
Puder et al.

(10) Patent No.: US 12,047,747 B2
(45) Date of Patent: Jul. 23, 2024

(54) HEARING INSTRUMENT AND METHOD FOR DIRECTIONAL SIGNAL PROCESSING OF SIGNALS IN A MICROPHONE ARRAY

(71) Applicant: Sivantos Pte. Ltd., Singapore (SG)

(72) Inventors: Henning Puder, Erlangen (DE); Eghart Fischer, Schwabach (DE); Tobias Daniel Rosenkranz, Bubenreuth (DE)

(73) Assignee: Sivantos Pte. Ltd., Singapore (SG)

( * ) Notice: Subject to any disclaimer, the term of this patent is extended or adjusted under 35 U.S.C. 154(b) by 171 days.

(21) Appl. No.: 17/849,940

(22) Filed: Jun. 27, 2022

(65) Prior Publication Data

US 2023/0007408 A1 Jan. 5, 2023

(30) Foreign Application Priority Data

Jun. 25, 2021 (DE) ..................... 10 2021 206 590.2

(51) Int. Cl.
*H04R 25/00* (2006.01)
*H04R 3/04* (2006.01)

(52) U.S. Cl.
CPC ............. *H04R 25/505* (2013.01); *H04R 3/04* (2013.01); *H04R 25/407* (2013.01)

(58) Field of Classification Search
None
See application file for complete search history.

(56) References Cited

U.S. PATENT DOCUMENTS 9,584,907 B2 2/2017 Aubreville et al.
2014/0307886 A1* 10/2014 Olsson ................ G10L 21/0232 381/71.7

FOREIGN PATENT DOCUMENTS

DE 102014204557 A1 9/2015
WO 2021110924 A1 6/2021

OTHER PUBLICATIONS

Doclo, Simon, et al. Multichannel signal enhancement algorithms for assisted listening devices: Exploiting spatial diversity using multiple microphones. IEEE Signal Processing Magazine, 2015, 32. Jg., Nr. 2, S. 18-30.

(Continued)

*Primary Examiner* — James K Mooney
(74) *Attorney, Agent, or Firm* — Laurence A. Greenberg; Werner H. Stemer; Ralph E. Locher

(57) ABSTRACT

A method for directional signal processing of signals of a microphone array, including first and second microphones generating first and second input signals from an ambient sound, uses the first input signal to form a reference signal transformed into the frequency domain, thereby generating a frequency-space reference signal. The first and second input signals are transformed into the frequency domain, and a first frequency-space directional signal is formed in the frequency domain using the transformed first and second input signals. A frequency-resolved comparison of the frequency-space reference signal with the first frequency-space directional signal or signal derived therefrom in the frequency domain, is used to generate frequency-dependent first gain factors to generate a time filter in the time domain. The reference signal is filtered by the time filter and an output signal is generated from the reference signal filtered by the time filter.

11 Claims, 2 Drawing Sheets

(56) References Cited

OTHER PUBLICATIONS

Loellmann, Heinrich W.; Vary, Peter. Low delay noise reduction and dereverberation for hearing aids. EURASIP Journal on advances in signal processing, 2009, 2009. Jg., S. 1-9.

* cited by examiner

HEARING INSTRUMENT AND METHOD FOR DIRECTIONAL SIGNAL PROCESSING OF SIGNALS IN A MICROPHONE ARRAY

CROSS-REFERENCE TO RELATED APPLICATION

This application claims the priority, under 35 U.S.C. § 119, of German Patent Application DE 10 2021 206 590.2, filed Jun. 25, 2021; the prior application is herewith incorporated by reference in its entirety.

FIELD AND BACKGROUND OF THE INVENTION

The invention relates to a method for directional signal processing of signals in a microphone array, which includes at least one first microphone for generating a first input signal from an ambient sound and a second microphone for generating a second input signal from the ambient sound, wherein the first input signal and the second input signal are transformed into the frequency domain, a first frequency-space directional signal is formed in the frequency domain using the transformed first input signal and the transformed second input signal, frequency-dependent first gain factors are generated in the frequency domain from the derived signal, and an output signal is generated by using the first gain factors and the frequency-space directional signal.

Frequency-resolved signal processing for a microphone array with one or more microphones is usually performed in the frequency domain by decomposing one or more microphone signals from the microphone array into individual frequency bands, with signal components of each frequency band being processed separately from one another, and in particular, differentially amplified and/or compressed and, if applicable, combined to form directional signals. The individual signal components in the frequency bands are then "synthesized" into a single output signal in the time domain.

The decomposition into individual frequency bands (in combination with the final synthesis) gives rise to a latency in the signal processing, which depends on the desired frequency resolution in the frequency domain and usually has a value of about 5-8 ms.

In real-time applications such as hearing instruments, in particular in hearing aids, such a latency often results in the direct sound from the surroundings being superimposed on the output signal delayed by the latency, which is reproduced by the hearing instrument. That can result in comb filter effects. Those are usually more pronounced the more closely the direct sound from the environment resembles the output signal processed and reproduced by the hearing instrument.

Comb filter effects are often perceived as unpleasant, so they are preferably to be avoided. One way to achieve that is to significantly reduce the latency in the signal processing or to prevent it as far as possible. However, that considerably limits the options available in the frequency-resolved signal processing, since it often requires a secondary signal path ("analysis path") to be used in which the signal processing is to be determined as it is to be applied to the signal processing of the signal components of the main signal path. In particular, a direction-dependent signal processing of the individual input signals generated by more than one microphone of the microphone array is difficult to carry out in the above scenario.

SUMMARY OF THE INVENTION

It is accordingly an object of the invention to provide a hearing instrument and a method for directional signal processing of signals of a microphone array, which overcome the hereinafore-mentioned disadvantages of the heretofore-known instruments and methods of this general type and which should have the lowest possible latency of a generated output signal compared to the input signals of the microphone array to be processed.

With the foregoing and other objects in view there is provided, in accordance with the invention, a method for directional signal processing of signals in a microphone array which includes at least one first microphone for generating a first input signal from an ambient sound and a second microphone for generating a second input signal from the ambient sound, the first input signal is used to form a reference signal, the reference signal is transformed into the frequency domain, thereby generating a frequency-space reference signal, the first input signal and the second input signal are each transformed into the frequency domain and a first frequency-space directional signal is formed in the frequency domain using the transformed first input signal and the transformed second input signal.

It is also provided that, by using a frequency-resolved comparison of the frequency-space reference signal with the first frequency-space directional signal or with a signal derived from the first frequency-space directional signal in the frequency domain, frequency-dependent first gain factors are generated, the first gain factors are used to generate a time filter in the time domain, the reference signal is filtered by using the time filter, and an output signal is generated from the reference signal filtered by using the time filter.

Advantageous embodiments, which are inventive in themselves, are the subject matter of the dependent claims and the following description.

In this case and in the following, a microphone shall include any electroacoustic input transducer which is configured to generate a corresponding input signal from the ambient sound, wherein sound pressure fluctuations of the ambient sound are converted by the input transducer into corresponding voltage or current fluctuations. A microphone array is to be understood accordingly as any spatial arrangement of at least two such input transducers, wherein the spatial distance between the input transducers allows direction-dependent signal processing.

The formation of the reference signal on the basis of the first input signal includes in particular the two cases in which, on one hand, the reference signal is formed only from the signal components of the first input signal but other signal components, in particular those of the second input signal, are not included in the reference signal, or that, on the other hand, the reference signal can be formed on the basis of the signal components of both input signals, in particular by using a time-delayed superposition of the two input signals. The reference signal in this case is a signal in the time domain.

The above-mentioned transformations of a signal into the frequency domain, i.e. in the present case, of the reference signal as well as the first and second input signals, can be carried out in particular by using an appropriately configured filter bank. In the following, the frequency domain shall also include in particular the time-discrete time-frequency domain, in which the spectral components of the individual transformed signals are updated according to a time variable.

The first frequency-space directional signal can be generated from the transformed first input signal and the transformed second input signal, in particular in such a way that the resulting directivity for the first frequency-space directional signal varies across the individual frequency bands (and that, for example, a linear combination of the two transformed input signals or a linear combination of intermediate signals derived from both input signals, such as cardioid/anticardioid signals, has different linear factors across the frequency bands).

The frequency-space reference signal is compared in a frequency-resolved manner, i.e. preferably frequency-band by frequency-band, with the first frequency-space reference signal or a signal derived from it in the frequency domain, so that the frequency-dependent first gain factors are generated as a quantitative result of this comparison. This comparison can be performed by spectral division (the first gain factors can then be determined directly in individual frequency bands as the respective quotients, which are formed during the division of the frequency-space reference signal by the first frequency-space directional signal). Other comparisons, for example in the form of a relative deviation and/or in the form of a non-linear, preferably monotonic function of the frequency band-dependent deviation of the two mentioned signals from each other, can also be envisaged. For a comparison of the frequency-space reference signal with a signal derived from the first frequency-space directional signal in the frequency domain, a second frequency-space directional signal is preferably used, the signal components of which can be derived directly from the first frequency-space directional signal and preferably without adding further signal components, e.g. though a frequency band-dependent amplification of the first frequency-space directional signal.

The first gain factors, which represent a measure of the deviation of the first frequency-space signal from the frequency-space reference signal in the respective frequency band (implicitly if necessary in the case of a derived signal) are then used to generate a time filter in the time domain. The time filter is preferably a filter with a finite impulse response (FIR). In particular, the time filter can be generated by a transformation of a transfer function from the frequency domain into the time domain, which represents the frequency band-dependent application of the first gain factors in the frequency domain. The time filter in this case is particularly preferably generated as a minimum-phase filter, which thus has a minimum possible latency for a given amplitude frequency response.

By using the time filter thus generated, the reference signal is filtered—in the time domain—and an output signal is generated. In particular, the output signal can now be transmitted to a receiver, recorded, or reused. If the microphone array is used in a hearing instrument, then the output signal is preferably converted into an output sound signal by a loudspeaker (in the broadest sense, an electroacoustic output transducer of the hearing instrument). Before this conversion, the output signal can be subjected to further signal processing, for example to suppress an acoustic feedback which can occur between the loudspeaker and the microphone array.

The use of a time filter, which is applied to the reference signal in the time domain, results in a significant reduction in the latency of the signal processing compared to the signal processing in the frequency domain. On the basis of the mapping of the first gain factors, obtained from the first frequency-space directional signal, onto the time filter, the information regarding the direction-dependent acoustic image in the individual frequency bands, as obtained from the generation of the first frequency-space directional signal, can be implemented in the time filter. However, the differences between the directional signal processing as applied to the first frequency-space directional signal compared to the reference signal, transformed into the frequency domain, are taken into account.

Thus, by comparing the frequency-space reference signal with the first frequency-space directional signal or with a signal preferably directly derived therefrom, it is determined which frequency band-dependent gain factors must be applied to the frequency-space reference signal (which actually represents only the reference signal transformed into the frequency domain) in order to approximate as closely as possible the frequency band-dependent sound characteristics present in the first frequency-space directional signal, particularly with regard to signal strengths and levels, etc. An application of the time filter, in particular a FIR filter, in the time domain corresponds to an application of frequency- and time-dependent attenuation or gain factors in each frequency band followed by a signal synthesis. This "encodes" the frequency band-dependent direction dependency encoded in the first frequency-space directional signal into the first gain factors for the frequency-space reference signal. By mapping these first gain factors (and thus the described coded information on the effect of the directivity) onto the time filter, this directional information can thus be made available to the reference signal with a very low latency.

Preferably, the frequency-resolved comparison of the frequency-space reference signal with the first frequency-space directional signal, or the signal derived from the first frequency-space directional signal in the frequency domain, is carried out using a spectral division, on the basis of which the frequency-dependent first gain factors are generated. The comparison by using a spectral division can on the one hand be implemented particularly efficiently and, on the other hand, takes into account the fact that the first gain factors thus represent a transfer function between the two mentioned signals in the frequency domain. The frequency-dependent first gain factors can be generated, in particular, by dividing the magnitudes of the frequency-space reference signal and the first frequency-space directional signal or the signal derived from the first frequency-space reference signal in the frequency domain.

Advantageously, as a signal derived from the first frequency-space directional signal in the frequency domain for the frequency-resolved comparison with the frequency-space reference signal, a second frequency-space directional signal is generated by applying frequency-dependent second gain factors to the first frequency-space directional signal. The first frequency-space signal can also undergo noise suppression, e.g. by using a Wiener filter, and, if necessary, dynamic compression, so that the frequency-space reference signal for the first gain factors is compared with the resulting second frequency-space directional signal.

The time filter in this case is conveniently formed from a mapping of the frequency-dependent first gain factors into the time domain. The term 'mapping' can mean, in particular, that a transfer function corresponding to the first gain factors, or a transfer function corresponding to a product of the first gain factors with further frequency band-dependent gain factors, is transformed from the frequency domain into the time domain. In this way, it can be efficiently ensured that a filter with the correct properties is applied to the reference signal in the time domain, i.e. with the properties that are present in the frequency domain due to the first gain factors. The time filter is generated in particular as a FIR filter.

It is advantageous to determine frequency-dependent second gain factors for the first frequency-space directional signal, wherein the time filter is formed on the basis of a common mapping of the first gain factors and the second gain factors into the time domain. In particular, the frequency-dependent second gain factors for the first frequency-space directional signal are determined by using noise suppression and/or dynamic compression and/or a hearing impairment to be corrected of a recipient of the output signal. The recipient of the output signal is in particular a user of a hearing instrument which includes the microphone array.

In other words: a noise reduction and/or a dynamic compression, which is/are to be applied to the first frequency-space directional signal in a frequency band-dependent manner, determines instantaneous second gain factors for the first frequency-space directional signal according to the respective signal-to-noise ratio (SNR) specifications or the maximum signal level specifications in the frequency bands (which may also be individually matched to a hearing impairment of the user of the hearing instrument including the microphone array). However, these are not applied to the first frequency-space directional signal. Instead, a common mapping of the first gain factors, which result from the comparison of the first frequency-space directional signal with the transformed reference signal, is applied into the time domain together with the second gain factors to create the time filter. The properties of the noise suppression or dynamic compression are therefore not input into the time filter by the comparison of the transformed reference signal with a second frequency-space directional signal, which results from the application of the noise suppression or dynamic compression to the first frequency-space directional signal, but in fact directly though a mapping of the second gain factors determined for the noise suppression or dynamic compression into the time domain.

It proves to be advantageous if the reference signal is only formed from signal components of the first input signal. This means in particular that no other signal components are included in the reference signal apart from the signal components of the first input signal, and that the first input signal is preferably used as a reference signal either directly or after a single-channel signal processing stage. The effect of the directional microphony thus results in forming the first frequency-space directional signal in the frequency domain (which of course contains the frequency-space reference signal, i.e. the transformed first input signal in the frequency domain), which is to be compared with the transformed reference signal. The resulting first gain factors then carry the full spectral information on how the directional microphony affects the transformed reference signal. A time filter, which is generated by mapping these first gain factors into the time domain, then transfers this spectral information to the reference signal.

In an advantageous embodiment, the reference signal is formed in the time domain from the first input signal and the second input signal as a time directional signal by using directional microphony. The directional microphony in the time domain can in particular be implemented as a time-delayed, and possibly differentially weighted, superposition of the two input signals (wherein the time delay is implemented in the time domain and is in particular the same for all spectral components of the two input signals). Using such a time directional signal as a reference signal allows the directivity to be increased overall, since e.g. broadband and/or dominant noise signals in the time directional signal, which are strongly localized, can be removed. A frequency band-dependent fine tuning of the microphone directivity is then carried out based on a comparison of the transformed time directional signal (i.e. the frequency-space reference signal) with the first frequency-space directional signal though the resulting time filter.

Preferably, the microphone array for carrying out the method also includes a third microphone for generating a third input signal from the ambient sound, wherein the third input signal is transformed into the frequency domain and the first frequency-space directional signal is also formed using the transformed third input signal in the frequency domain. In particular, the microphone array can also include a fourth or larger number of microphones. The described method can be easily transferred to such a microphone array with three or more microphones.

With the objects of the invention in view, there is also provided a method for directional signal processing in a hearing instrument including a microphone array with at least one first microphone for generating a first input signal from an ambient sound and a second microphone for generating a second input signal from the ambient sound, as well as a control unit, and wherein an output sound signal of the hearing instrument for reproduction is generated from the first input signal and the second input signal according to the method described above. The advantages specified for the method for directional signal processing of signals of a microphone array and for its refinements can be transferred mutatis mutandis to the method for directional signal processing in a hearing instrument. The method for directional signal processing of signals of a microphone array is therefore applied in particular to the input signals of a microphone array which is part of a hearing instrument.

With the objects of the invention in view, there is concomitantly provided a hearing instrument with a microphone array which includes at least one first microphone for generating a first input signal from an ambient sound and a second microphone for generating a second input signal from the ambient sound, and also a control unit, wherein the control unit is configured to carry out the method just mentioned using the first and second input signals. The hearing instrument shares the advantages of the method for directional signal processing of signals from a microphone array. The advantages specified for the method and for its refinements can be transferred mutatis mutandis to the hearing instrument. In particular, the hearing instrument may be configured as a hearing aid which is intended and configured to treat a hearing impairment.

Other features which are considered as characteristic for the invention are set forth in the appended claims.

Although the invention is illustrated and described herein as embodied in a hearing instrument and a method for directional signal processing of signals in a microphone array, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
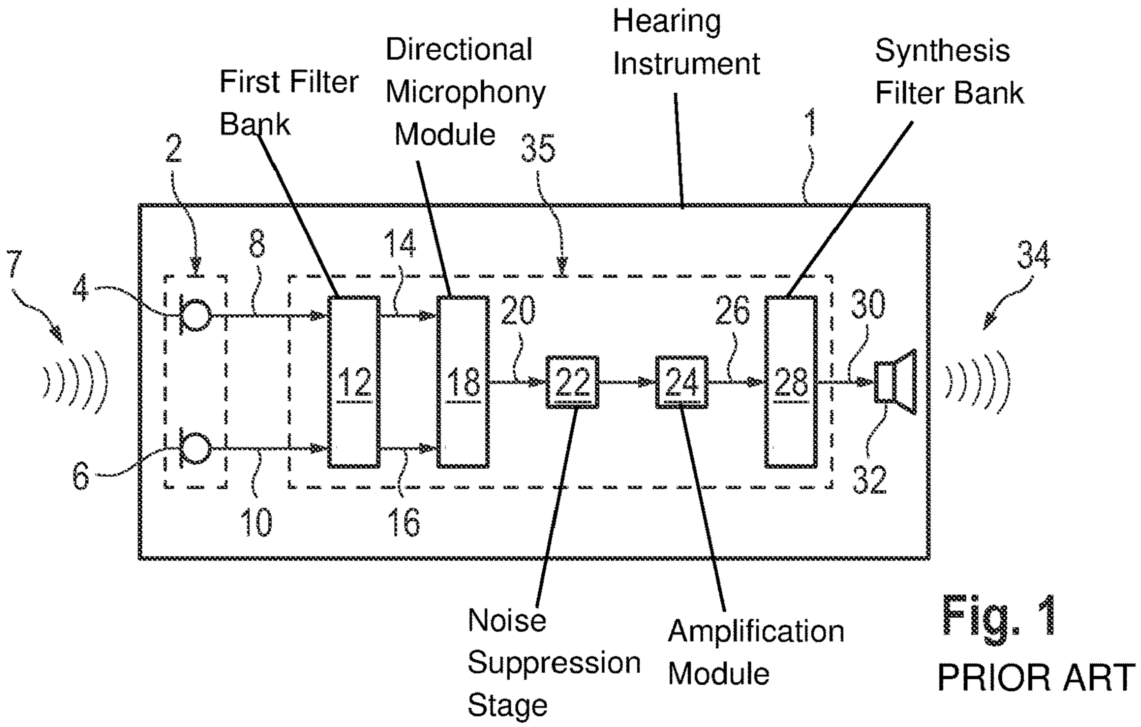
Fig. 1 PRIOR ART
FIG. 1 is a block diagram of a hearing instrument with a microphone array and directional signal processing according to the prior art.

Referring now in detail to the figures of the drawings, in which equivalent parts and dimensions are provided with identical reference signs, and first, particularly, to FIG. 1 thereof, there is seen a schematic block diagram of a hearing instrument 1 which includes a microphone array 2 with a first microphone 4 and a second microphone 6. The signal processing described below of the hearing instrument 1 shown in FIG. 1 is configured according to the prior art. The first microphone 4 is configured to generate a first input signal 8 from an ambient sound 7 that is incident on the microphone array 2. Accordingly, the second microphone 6 is configured to generate a second input signal 10 from the ambient sound 7. It is assumed that a possible pre-amplification and/or digitization of the first or second input signal 8, 10 has already been recorded in the corresponding first or second microphone 4, 6. The first and second input signals 8, 10 are each fed to a first filter bank 12, where they are transformed into the frequency domain so that a transformed first input signal 14 or a transformed second input signal 16 is generated.

In a directional microphony module 18, a first frequency-space directional signal 20 is formed from the transformed first input signal 14 and the transformed second input signal 16 in the frequency domain. In order to form the first frequency-space directional signal 20, any algorithm suitable for forming a frequency band-dependent directional signal can be used in the directional microphony module 18, i.e. in particular delay-and-sum beamforming, delay-and-subtract beamforming, adaptive differential directional microphony, etc. The first frequency-space directional signal 20 is subjected to noise suppression 22, in which, in particular, a useful signal component and a noise signal component are estimated for each of the individual frequency bands, and a gain factor is determined for each frequency band as a function of the useful signal components or noise signal components, so that frequency bands with a high useful signal component are relatively increased and frequency bands with a high noise signal component are relatively reduced.

After the noise suppression 22 the resulting signal is fed to an amplification module 24, which in particular can include an AGC for dynamic compression of the frequency band-dependent signal components, and using an appropriate adaptation of frequency band-dependent amplification factors can compensate for an individual hearing impairment of a user of the hearing instrument 1.

A processed second frequency-space directional signal 26 results from the amplification module 24. This second frequency-space directional signal 26 is fed to a synthesis filter bank 28, which merges the frequency band-dependent signal components of the second frequency-space directional signal 26 and transforms them into the time domain. An output signal 30 resulting from this transformation is converted by a loudspeaker 32 of the hearing instrument 1 into an output sound signal 34. The signal processing described herein, from the first filter bank 12 to the synthesis filter bank 28, is preferably carried out on an appropriately configured signal processor or a processor unit including such a signal processor. Such a processor unit is indicated schematically in FIG. 1 as a control unit 35.

Through the use of the first filter bank 12 and the synthesis filter bank 28, the output signal 30 inevitably experiences a latency relative to the two input signals 8, 10, and thus relative to the ambient sound 7, which is greater the higher the frequency resolution of the first filter bank 12. Typically, this latency is approximately 4 to 7 ms. Although a significant reduction in the latency can be achieved by reducing the frequency resolution, this will also be at the expense of the beamforming capability as well as the ability to suppress interference signal components in the two input signals 8, 10 by using the noise suppression 22, and, possibly, the ability to adjust the gain in the amplification module 24 individually to suit the user of the hearing instrument 1.

Figure 2:
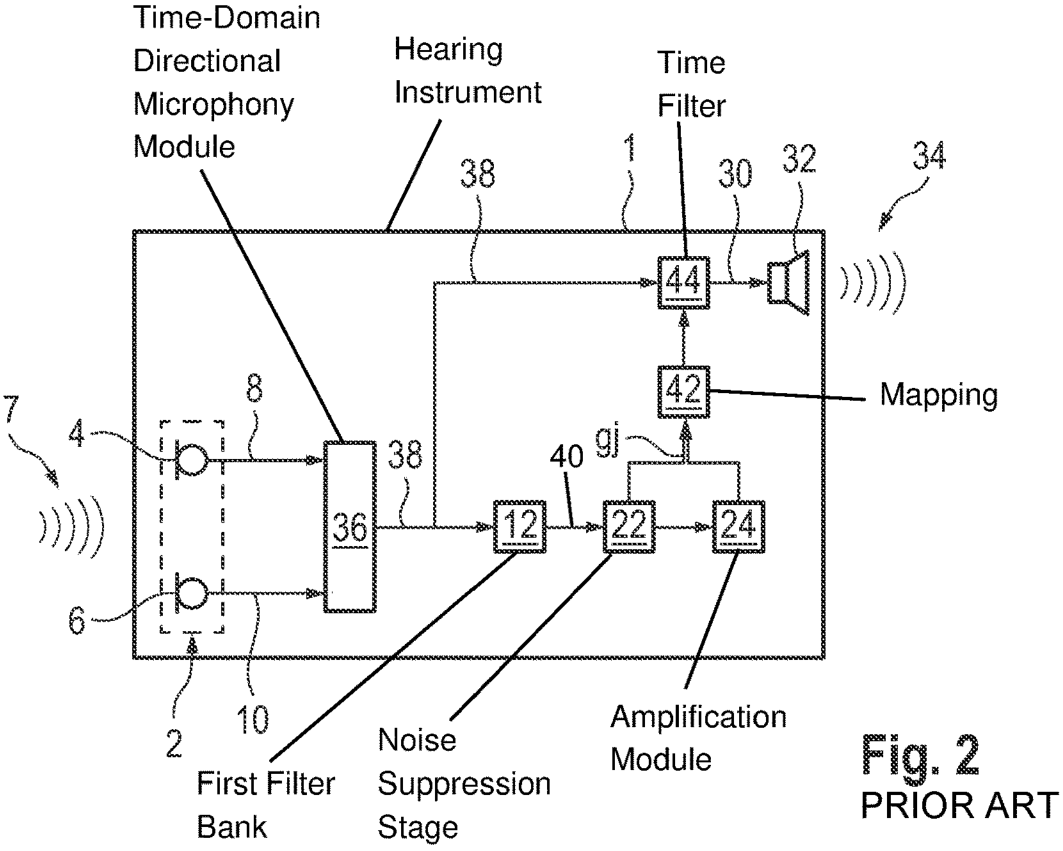
Fig. 2 PRIOR ART
FIG. 2 is a block diagram of an alternative embodiment of the signal processing of the hearing instrument of FIG. 1, according to the prior art.

FIG. 2 shows a block diagram schematically illustrating a variation of the hearing instrument 1 according to FIG. 1, which attempts to solve the described problems of latency that occur as a result of the first filter bank 12 and the synthesis filter bank 28. The signal processing shown in FIG. 2 is also configured according to the prior art in this respect. In the hearing instrument 1 according to FIG. 2, a time directional signal 38 is formed from the first input signal 8 and the second input signal 10 by using a time-domain directional microphony module 36. The time directional signal 38 is transformed into the frequency domain by the first filter bank 12, and a resulting transformed time directional signal 40 is fed to the noise suppression stage 22 and then to the amplification module 24. In this case, frequency band-dependent gain factors gj are determined, which are mapped onto a time filter 44 in the time domain by using a mapping 42, which in particular can include a Fourier transformation. The control unit 35 according to FIG. 1 is not shown in FIG. 2.

The time filter 44 thus implicitly contains the properties of the frequency band-dependent gain factors gj and their effects on the transformed time directional signal 40, but now in the time domain. Accordingly, the time filter 44 is applied to the (original) time directional signal 38 in the time domain to generate the output signal 30. In particular, the time filter 44 is specified as a minimum-phase filter.

While the processing of the input signals 8, 10 described on the basis of FIG. 2 can indeed reduce the latency compared to the exemplary embodiment of FIG. 1, in that case, however, due to the necessarily broadband directional microphony in the time domain, which is applied to the input signals 8, 10 in the corresponding module 36, there are no available measures for performing a frequency-selective signal processing (e.g. for noise suppression) during the directional microphony.

Figure 3:
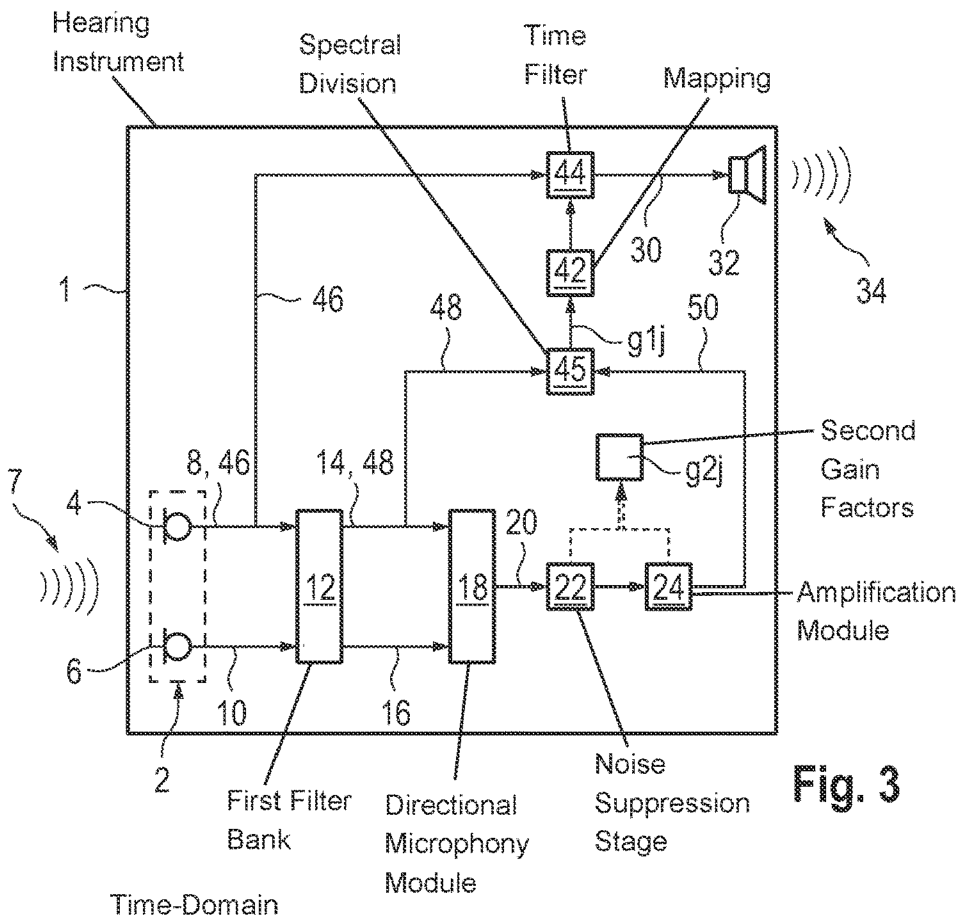
FIG. 3 is a block diagram of an embodiment of the directional signal processing of the hearing instrument according to FIG. 1 with reduced latency.

FIG. 3 schematically shows a block diagram of a hearing instrument 1 in which the latency is to be kept as low as possible for an ideally frequency-selective, direction-dependent signal processing. The first input signal 8 is used as a reference signal 46. The effects of frequency-selective directional microphony and noise suppression on the individual frequency bands are determined in a manner yet to be described using the reference signal 46, and thus the time filter 44 to be applied to the reference signal 46 is specified.

The first input signal 8 as the reference signal 46 and the second input signal 10 are transformed into the frequency domain by the first filter bank 12, in a similar way to the exemplary embodiment shown in FIG. 1, thus generating the transformed first input signal 14 as a frequency-space reference signal 48 or the transformed second input signal 16. Also in the present exemplary embodiment, the directional microphony module 18 is then used to generate the first frequency-space directional signal 20 from the transformed first input signal 14—i.e. the frequency-space reference signal 48—and from the transformed second input signal.

In order to specify the time filter 44, which is preferably to be specified as a minimum-phase filter, first gain factors g1j are obtained in a frequency band-dependent manner, which are determined by a spectral division 45 of the frequency-space reference signal 48 and of a second frequency-space directional signal 50 derived from the first frequency-space directional signal 20. In particular, the magnitudes of the frequency-space reference signal 48 and the second frequency-space reference signal 50 derived from it, or else quantities derived from the magnitudes, can also be divided frequency band-dependently in order to generate the first gain factors g1j.

This second frequency-space directional signal 50 is generated by feeding the first frequency-space directional signal 20 to the noise suppression stage 22 and to the amplification module 24, where the first frequency-space directional signal 20 is amplified or attenuated frequency band-dependently by applying second gain factors g2j to the first frequency-space directional signal 20 frequency band-dependently. For example, the second gain factors g2j can be formed in each frequency band from the successive application of the individual factors which were determined respectively in the noise suppression 22 and in the amplification module 24 for the respective frequency band.

The spectral division 45 determines de facto the manner in which the signal processing applied to the first frequency-space directional signal 20, which takes place in the noise suppression stage 22 and in the amplification module 24, is to be modified or compensated if the input variable is not that first frequency-space directional signal 20, but instead the frequency-space reference signal 48. If the first gain factors g1j resulting from the spectral division 45 were applied to the frequency-space reference signal 48, the resulting signal would correspond in magnitude to the second frequency-space directional signal 50 which results from the application of the noise suppression 22 and the amplification module 24 (or from the second gain factors g2j determined there) to the first frequency-space directional signal 20.

The first gain factors g1j resulting from the spectral division 45 are now mapped from the frequency domain to the time filter 44 in the time domain using the mapping 42, which is preferably provided by a FIR filter. The time filter 44 is thus the equivalent in the time domain to the just described "modification" or "compensation" of the signal processing of the first frequency-space directional signal 20 which must be applied to the frequency-space reference signal 46. In this respect, the influence of the transformed input signal 16 on the second frequency-space directional signal 50 is also incorporated into the time filter 44 though the spectral division 45. Accordingly, the output signal is generated from an application of the time filter 44 to the frequency-space directional signal 48.

The time filter 46 in the time domain allows the latency to be kept very low, since latencies which arise e.g. due to the first filter bank 12 do not affect the propagation of the reference signal 46 through the signal flow, but only cause the time filter 44 which is applied to the reference signal 46 to be no longer "current" by the amount of the latency, which can be accepted, however, as a trade-off against the significantly reduced latency of the output signal 30 compared to the exemplary embodiment according to FIG. 1.

Figure 4:
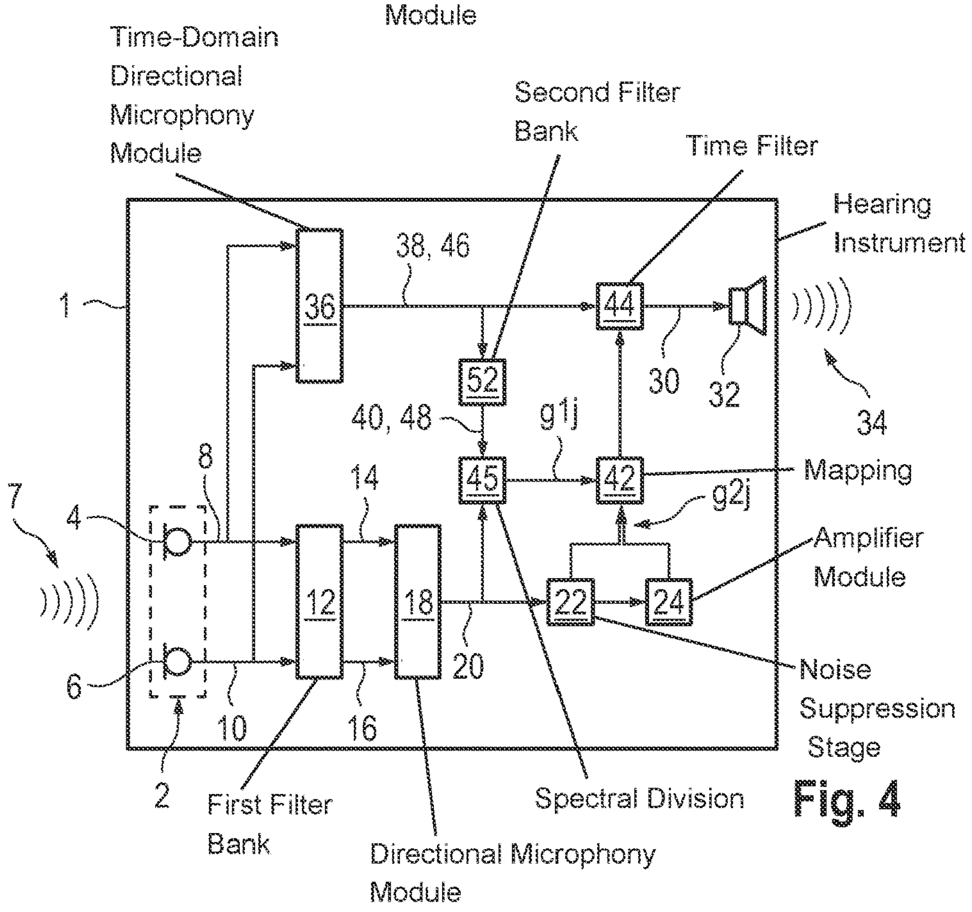
FIG. 4 is a block diagram of an embodiment of the directional signal processing with reduced latency, which is an alternative to FIG. 3.

FIG. 4 shows a schematic block diagram of an alternative embodiment of the signal processing described according to FIG. 3, which also contains elements of the exemplary embodiment according to FIG. 2, namely that the time filter 44 is applied to a directional signal in the time domain in a manner to be illustrated below.

From the first input signal 8 and the second input signal 10, a time directional signal 38 is first generated by using the time-domain directional microphony module 36. This can be effected, for example, by applying a delay of one of the two input signals 8, 10 relative to the other, which can vary over time but always has the same effect on all signal components (and therefore in particular acts in a frequency-independent way). In particular, the time directional signal 38 can also be generated by applying an all-pass filter with a frequency-dependent delay to one of the two input signals 8, 10 in the time-domain directional microphony module 36, so that the time directional signal 38 itself can already exhibit a certain frequency dependency with regard to the directional effect.

In addition, the first and the second input signals 8, 10 are transformed into the frequency domain by using the first filter bank 12, and the first frequency-space directional signal 20 is generated from the transformed first and second input signals 14, 16 by using the directional microphony module 18 in the frequency domain.

The time directional signal 38 generated as described above in the present exemplary embodiment serves as the reference signal 46, which is transformed into the frequency domain by using a second filter bank 52, thereby generating the transformed time directional signal 40 as the frequency-space reference signal 48. This and the first frequency-space directional signal 20 are subjected to the spectral division 45 to be compared with each other, thereby determining the first gain factors g1j for the respective frequency bands.

For the first frequency-space directional signal 20 generated as described above, second gain factors g2j are determined by the noise suppression stage 22 and the amplifier module 24, which would need to be applied appropriately to the first frequency-space directional signal 20 to achieve the noise suppression effect of the noise suppression stage 22 or the amplification effect of the amplification module 24 for the first frequency-space directional signal 20.

In contrast to the exemplary embodiment according to FIG. 3, however, this noise suppression effect or amplification effect is not achieved directly in the first frequency-space directional signal 20. Rather, the second gain factors g2j corresponding to those effects, which were determined in the noise suppression stage 22 and in the amplification module 24, are now combined with the first gain factors g1j, which were obtained from the spectral division 45 of the frequency-space reference signal 48 and the first frequency-space reference signal 20, and mapped in the time domain onto the time filter 44 by using the mapping 42. The time filter 44 thus determined, which in this case also is preferably configured as a FIR filter, is then applied to the reference signal 46 in the time domain—i.e. to the time directional signal 38—thus generating the output signal 30. Finally, the output signal 30 is converted into the output sound signal 34 by the loudspeaker 32.

The spectral division 45 in the exemplary embodiment according to FIG. 4 determines to what extent the frequency selective beamforming of the directional microphony module 18 (frequency domain) differs from the broadband beamforming of the time-domain directional microphony module 36, so that the first gain factors g1j generated thereby represent de facto the magnitude in the instantaneous gain by which the transformed time directional signal 40 must be compensated in a frequency band-dependent manner, in order to obtain the intrinsic, direction-sensitive sound characteristic inherent in the first frequency-space directional signal 20. This direction-sensitive sound characteristic, characterized by the first gain factors g1j, is thus mapped together with the noise suppression and amplification effect of the noise suppression stage 22 and the amplification module 24, characterized by the second gain factors g2j, in the time domain onto the time filter 44, so that that sound characteristic and those effects can be achieved by applying the time filter 44 to the equivalent of the transformed time directional signal 40 in the time domain, i.e. precisely to the time directional signal 38.

By applying the time filter 44 as described, in this exemplary embodiment it is also possible to keep the latency of the output signal 30 very low relative to the two input signals 8, 10 and thus relative to the ambient sound 7, in comparison to the exemplary embodiment according to FIG. 1.

Although the invention has been illustrated and described in greater detail by using the preferred exemplary embodiments, the invention is not restricted by the examples disclosed and other variations can be derived therefrom by the person skilled in the art without departing from the scope of protection of the invention.

The following is a summary list of reference numerals and the corresponding structure used in the above description of the invention.

| List of Reference Signs: | |
|---|---|
| 1 | hearing instrument |
| 2 | microphone array |
| 4 | first microphone |
| 6 | second microphone |
| 7 | ambient sound |
| 8 | first input signal |
| 10 | second input signal |
| 12 | first filter bank |
| 14 | transformed first input signal |
| 16 | transformed second input signal |
| 18 | directional microphony module |
| 20 | first frequency-space directional signal |
| 22 | noise suppression |
| 24 | amplification module |
| 26 | second frequency-space directional signal |
| 28 | synthesis filter bank |
| 30 | output signal |
| 32 | loudspeaker |
| 34 | output acoustic signal |
| 35 | control unit |
| 36 | time-domain directional microphony module |
| 38 | time directional signal |
| 40 | transformed time directional signal |
| 42 | mapping |
| 44 | time filter |
| 45 | spectral division |
| 46 | reference signal |
| 48 | transformed reference signal |
| 50 | second frequency-space directional signal |
| 52 | second filter bank |
| g1j | first gain factors |
| g2j | second gain factors |
| gj | frequency-band-dependent gain factors |

The invention claimed is:

1. A method for directional signal processing of signals in a microphone array including at least one first microphone for generating a first input signal from an ambient sound and a second microphone for generating a second input signal from the ambient sound, the method comprising:

using the first input signal to form a reference signal;

transforming the reference signal into the frequency domain and generating a frequency-space reference signal;

transforming each of the first input signal and the second input signal into the frequency domain, and forming a first frequency-space directional signal in the frequency domain using the transformed first input signal and the transformed second input signal;

generating frequency-dependent first gain factors by using a frequency-resolved comparison of the frequency-space reference signal with the first frequency-space directional signal or a signal derived from the first frequency-space directional signal in the frequency domain;

using the first gain factors to generate a time filter in the time domain; and using the time filter to filter the reference signal, and generating an output signal from the reference signal filtered by using the time filter.

2. The method according to claim 1, which further comprises carrying out the frequency-resolved comparison of the frequency-space reference signal with the first frequency-space directional signal or the signal derived from the first frequency-space directional signal in the frequency domain, by using a spectral division, based on which the frequency-dependent first gain factors are generated.

3. The method according to claim 1, which further comprises generating a second frequency-space directional signal as a signal derived from the first frequency-space directional signal in the frequency domain for the frequency-resolved comparison with the frequency-space reference signal, by applying frequency-dependent second gain factors to the first frequency-space directional signal.

4. The method according to claim 3, which further comprises forming the time filter by using a mapping of the frequency-dependent first gain factors into the time domain.

5. The method according to claim 3, which further comprises determining the frequency-dependent second gain factors for the first frequency-space directional signal by using at least one of noise suppression or dynamic compression or a hearing impairment to be corrected of a recipient of the output signal.

6. The method according to claim 1, which further comprises:

determining frequency-dependent second gain factors for the first frequency-space directional signal; and forming the time filter by using a common mapping of the first gain factors and the second gain factors into the time domain.

7. The method according to claim 1, which further comprises forming the reference signal from signal components of the first input signal only.

8. The method according to claim 1, which further comprises forming the reference signal in the time domain from the first input signal and the second input signal as a time directional signal by using directional microphony.

9. The method according to claim 1, which further comprises:

providing the microphone array with a third microphone for generating a third input signal from the ambient sound; and transforming the third input signal into the frequency domain, and forming the first frequency-space directional signal in the frequency domain from the transformed third input signal.

10. A method for directional signal processing in a hearing instrument, the method comprising:

providing the hearing instrument with the microphone array having at least one first microphone for generating the first input signal from the ambient sound and the second microphone for generating the second input signal from the ambient sound;

providing the hearing instrument with a control unit; and generating from the first input signal and the second input signal the output signal of the hearing instrument intended for reproduction, according to claim 1.

11. A hearing instrument, comprising:

the microphone array including at least one first microphone for generating the first input signal from the ambient sound and the second microphone for generating the second input signal from the ambient sound; and the control unit configured to carry out the method according to claim 10 by using the first and the second input signals.

* * * * *